INVENTORS:
ROBERT P. HAMLEN,
ELIHU C. JERABEK,
by Paul R. Webb, II
THEIR ATTORNEY

United States Patent Office 3,578,504
Patented May 11, 1971

3,578,504
METHOD OF ACTIVATING A SILVER OXIDE-ZINC PRIMARY CELL
Robert P. Hamlen, Scotia, and Elihu C. Jerabek, Delmar, N.Y., assignors to General Electric Company
Filed July 1, 1969, Ser. No. 838,066
Int. Cl. H01m 17/00
U.S. Cl. 136—102                    2 Claims

ABSTRACT OF THE DISCLOSURE

A silver oxide-zinc primary cell is disclosed which comprises a casing, a zinc anode positioned in the casing, a separator on each side of the anode, a silver oxide cathode on each side of the anode adjacent each separator and spaced from the anode, and magnesium oxide powder contained within the cell. A method is disclosed for activating such a cell which does not contain the magnesium oxide powder which comprises mixing together 5 to 40 weight percent of magnesium oxide powder in an aqueous alkaline electrolyte thereby forming a pourable electrolytic solution, filling the assembled cell with the electrolytic solution, and allowing the viscosity of the solution to increase prior to discharging the cell. A method is also disclosed for forming such a cell wherein magnesium oxide powder is added to the cell during assembly, and the assembled cell is filled with an aqueous alkaline electrolyte prior to use. In both of these methods upon activation of the previously assembled cell, a high viscosity electrolytic solution results thereby preventing silver migration to the anode and other cell components.

---

This invention relates to silver oxide-zinc primary cells and to methods of forming such cells and, more particularly, to such cells containing magnesium oxide powder and to methods of forming such cells with a high viscosity electrolytic solution added to the cell prior to use.

Normally, a primary silver oxide-zinc cell has a metallic casing with central zinc anode, normally a cellophane separator wrapped around the anode, a divalent silver oxide cathode on each opposite side of the anode and spaced therefrom by the separator, and an aqueous alkaline electrolyte in contact with the electrodes. Such batteries are manufactured generally in a charged state thereby available to produce electrical energy upon discharge.

One serious problem associated with silver oxide-zinc primary cells is that the silver oxide is slightly soluble in most alkaline electrolytes. This allows silver to migrate to the zinc electrode and to the various cell components. The deposition of silver on the zinc electrode increases the direct reaction of the zinc with the electrolyte, causing a greater pressure buildup in the cell as a result of hydrogen evolution. Electrolyte leakage is also caused during gas venting. Deposition on cell components, such as on the ceramic insulator, may also result in short circuits in the cell.

Frequently, such cells employ cellophane or other microporous membrane-type separators adjacent the electrodes to minimize silver migration. This introduces another serious problem of electro-osmotic pumping of electrolyte toward the silver oxide cathode, which decreases both the volume and the concentration of electrolyte adjacent the anode.

Our present invention is directed to such cells and to methods of forming such cells which eliminate or reduce substantially the above problems of silver migration, electrolyte pumping and electrolyte leakage during gas venting.

Primary galvanic cells are known which include during their manufacture the inclusion of an immobilized alkaline electrolyte having an aqueous alkali and a gel or paste forming material of, for example, magnesium hydroxide. Such a cell is described, for example, in U.S. Letters Patent 2,180,839 issued Nov. 21, 1939, for a "Primary Cell."

Our invention is directed to an improved method of forming a silver oxide-zinc cell wherein an initially pourable high viscosity electrolytic solution is introduced into the cell after assembly of the cell and prior to use. Present gelled electrolytes, which have not been used as disclosed in the present invention, are too viscous to fill a cell after assembly.

It is a primary object of our invention to provide a long life silver oxide-zinc primary cell and method of forming such a cell which during operation is not subjected to silver migration, electrolyte pumping or electrolyte leakage.

It is another object of our invention to provide an improved method of generating electrical energy from such a battery.

In accordance with one aspect of our invention, a method of forming a silver oxide-zinc primary cell comprises providing a casing, providing a zinc anode positioned in the casing, providing at least one silver oxide cathode positioned in the casing and spaced from the anode, adding magnesium oxide powder within the casing, closing the casing, and filling the assembled cell prior to use with an alkaline electrolyte.

There and various other objects, features and advantages of the invention will be better understood from the following description taken in connection with the accompanying drawing in which.

Figure 1:
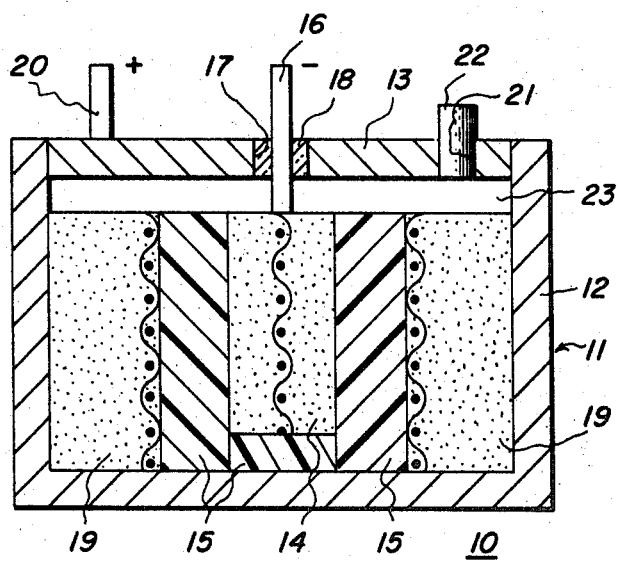
FIG. 1 is a sectional view of a cell made in accordance with our invention.

In FIG. 1 of the drawing, there is shown generally at 10 a cell embodying our invention which has a metallic casing 11 including a metallic body portion 12 and a metallic cover portion 13 sealed thereto. A central zinc anode 14 is shown positioned within body portion 12 and surrounded except at the top with one, or more chemically inert, cellophane separators 15. An electrical lead 16 extends from anode 14 through an aperture 17 in cover portion 13. An electrically insulating, ceramic insulator 18 is positioned in aperture 17 and lead 16 passes through the insulator to the exterior of the cell. A divalent silver oxide cathode 19 is shown positioned on each side of anode 14 and spaced therefrom by separators 15. An electrical lead 20 is attached to cover portion 13 for cathodes 19 which are in electrical contact with both body portion 12 and cover portion 13. A vent opening 21 is provided in cover portion 13, which opening is closed by a removable vent cover 22. The electrolytic solution of magnesium oxide in the electrolyte is introduced prior to cell use through vent opening 21 into a chamber 23 defined by the space above the electrode and separators, and below the cover portion.

Figure 2:
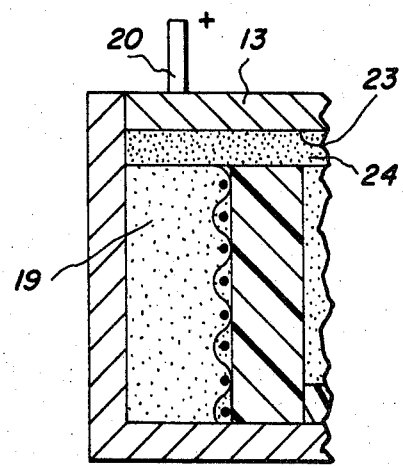
FIG. 2 is a partial sectional view of a modified cell made in accordance with our invention.

In FIG. 2 there is shown a partial sectional view of a cell similar to FIG. 1 which is modified by chamber 23 being filled with magnesium oxide powder 24 prior to metallic cover 13 being sealed to body portion 12. The alkaline electrolyte is introduced prior to cell use through the vent opening (not shown).

We found unexpectedly that an assembled silver oxide-zinc primary cell could be activated by mixing together 5 to 40 weight percent of magnesium oxide powder in an aqueous alkaline electrolyte thereby forming a pourable electrolytic solution, filling the assembled cell with the electrolytic solution, and allowing the viscosity of the solution to increase prior to discharging the cell.

We found further that we could form a silver oxide-zinc primary cell by providing a casing, providing a zinc anode positioned in the casing, providing at least one silver oxide cathode positioned in the casing and spaced from the anode, adding magnesium oxide powder within the casing, closing the casing, and filling the assembled cell prior to use with an aqueous alkaline electrotlye. We found further that we could form such a silver oxide-zinc primary cell with a casing, a zinc anode positioned in the casing, at least one silver oxide cathode positioned in the casing and spaced from the anode, and magnesium oxide powder contained within the cell.

Various aqueous electrolytes can be employed such as sodium hydroxide, potassium hydroxide, etc. We prefer to use a metal casing for the cell but this is not essential. We prefer also to employ a pair of silver oxide cathodes rather than a single cathode.

We found that adding the electrolytic solution to the cell or adding the electrolyte to the cell containing magnesium oxide powder prior to use increased the shelf life. We found that after the electrolytic solution was prepared, several minutes elapsed before the viscosity of the solution increased appreciably. During this time period, the solution can be poured into the cell after which it gels within the cell. This method provides the desirable effects of eliminating silver migration, electrolytic pumping, and leakage of electrolyte. These advantages are also obtained when the magnesium oxide is provided initially in the cell during assembly and the electrolyte is added to the cell after assembly and prior to use.

Various amounts of magnesium oxide powder, a unique material for use with silver oxide-zinc electrodes, can be employed in an alkali hydroxide electrolyte to form an electrolytic solution. We found the preferred range of magnesium oxide powder to be 5 to 40 weight percent in the electrolyte.

Examples of silver oxide-zinc primary cells are set forth below. A cell, which was not made in accordance with our invention, is set forth below in Example 1. Cells, which were made in accordance with our invention, are set forth in Examples 2 and 3.

EXAMPLE 1

A silver oxide-zinc primary cell was made as shown generally in FIG. 1 of the drawing. A zinc anode was wrapped on all sides except the top with a chemically inert cellophane separator material and positioned centrally within the stainless steel body portion of a cell casing. A divalent silver oxide cathode was positioned on each side of the anode and spaced therefrom by the separator material. Each cathode was in electrical contact with the metallic body portion of the cell casing while the anode was electrically connected to an electrical lead extending upwardly from the anode.

An electrolyte of 30 percent potassium hydroxide was added to the cell after which a metallic cover portion was sealed to the upper open end of the body portion. The electrical lead from the anode extended through an aperture in the cover portion, which aperture included a ceramic insulator to electrically insulate the lead from the metallic cover. An electrical lead for the cathode was attached to the metal cover. A vent opening was also provided which included a vent closure for the opening.

Each of the silver oxide electrodes had a capacity of 5.3 ampere hours while the anode had a capacity of 10.5 ampere hours. This cell, which was not made in accordance with applicants' invention, had an initial voltage of 1.609 volts when tested after assembly. It was noted that this voltage fell to 0.712 volt under no load condition within 800 hours after assembly. A load was then connected across the electrodes of the cell and the cell would not discharge above 1 volt. The cell was disassembled and examined visually. It was noted that the ceramic insulator was coated with a dark deposit of silver which apparently caused an initial short circuit across the ceramic insulator resulting in the initial drop in voltage under no load conditions.

EXAMPLE 2

A silver oxide-zinc cell was made as described above in Example 1 with the exception that no electrolyte was added to the cell prior to assembly of the cell. A mixture of 10.0 percent magnesium oxide in 30 percent sodium hydroxide was formed into a pourable electrolytic solution which was then added immediately to the interior of the cell through the vent opening, which was then closed. The cell was allowed to stand for a period of 24 hours to allow the electrolytic solution to become highly viscous. There was no decrease in initial cell voltage under no load conditions as occurred in Example 1. The cell was then discharged at a current of 10.0 milliamperes for a period of 940 hours. The efficiency of the cell was 94 percent.

EXAMPLE 3

A silver oxide-zinc cell was made as set forth above in Example 1 with the exception that 0.5 gram of magnesium oxide powder was added to the cell as shown in FIG. 2 prior to completing the assembly of the cell. Thirty weight percent sodium hydroxide was added to the cell to provide an electrolytic solution having 15 percent magnesium oxide powder in the electrolyte. The cell was allowed to stand for a period of 24 hours so that the electrolytic solution became highly viscous. This cell did not exhibit a decrease in initial cell voltage under no load as occurred in Example 1. The cell was then discharged at a current of 23.5 milliamperes for a period of 350 hours. The cell was then discharged further at a current of 3.5 milliamperes for 330 hours giving 9.38 ampere hours or 92 percent efficiency. Upon subsequent disassembly and visual observation, there was no evidence of silver migration on the insulator or anode.

While other modifications of the invention and variations thereof which may be employed within the scope of the invention have not been described, the invention is intended to include such as may be embraced within the following claims.

What we claim as new and desire to secure by Letters Patent of the United States is:

1. A method of activating an assembled closed, vented silver oxide-zinc primary cell which comprises mixing together 5 to 40 weight percent of magnesium oxide powder in an aqueous alkaline electrolyte thereby forming a pourable electrolytic solution, filling the assembled cell through the vent opening with the electrolytic solution, closing the vent opening, and allowing the viscosity of the solution to increase to form a gel prior to discharging the cell to prevent silver migration after discharging.

2. A method as in claim 1, in which the aqueous alkaline electrolyte is sodium hydroxide.

References Cited
UNITED STATES PATENTS

| | | | |
|---|---|---|---|
| 1,864,652 | 6/1932 | Heise | 136—154 |
| 2,527,576 | 10/1950 | Ruben | 136—125.2 |
| 2,536,699 | 1/1951 | Ruben | 136—107A |
| 3,427,203 | 2/1969 | Fletcher | 136—125 |
| 3,440,104 | 4/1969 | Huber | 136—125 |
| 3,466,197 | 9/1969 | Bawa | 136—153 |
| 3,470,028 | 9/1969 | Sizer, Jr. et al. | 136—153 |
| 3,481,788 | 12/1969 | Hamlen et al. | 136—153 |

WINSTON A. DOUGLAS, Primary Examiner

C. F. LE FEVOUR, Assistant Examiner

U.S. Cl. X.R.

136—30, 107, 157